United States Patent Office 2,714,612
Patented Aug. 2, 1955

2,714,612

SEPARATION OF 4- AND 5-NITRO-ANTHRANILIC ACID

Hardin Kibbe Porter, Wilmington, Del., assignor to E. I. du Pont de Nemours and Company, Wilmington, Del., a corporation of Delaware No Drawing. Application May 25, 1954,
Serial No. 432,308

6 Claims. (Cl. 260—518)

This invention relates to a process for separating isomeric compounds, and more particularly to the separation of 4-nitroanthranilic acid from the isomeric 5-nitroanthranilic acid. Both of these isomers are useful as dye intermediates and as intermediates for the preparation of other chemicals.

For years it has been known that the 4- and 5-nitroanthranilic acids may be prepared by subjecting 4-nitrophthalimide to the Hofmann reaction with concentrated sodium hydroxide and chlorine or chlorinated lime. This reaction, however, produces an isomeric mixture of the two nitroanthranilic acids, which according to the literature are usually separated from organic solvents, more particularly xylene. See, for instance, the article by Seidel and Bittner, Berichte 34, 4351 (1901) and Monatshefte 23, 415 (1902). A further process for the separation of these acids has been described by Yanagita and Kubata in J. Pharm. Soc. Jap. 72, 1845 (1952); also in Chem. Ab. 47, 3269 (1953), in which the isomeric nitroanthranilic acids are dissolved in a large amount of 61% nitric acid at 5° to 10° C. This solution is then further diluted with water to produce a 35% solution of nitric acid from which the 5-nitroanthranilic acid first separates. To obtain the 4-nitroanthranilic acid, the filtrate is neutralized to precipitate the 4-nitroanthranilic acid, which is then recrystallized from alcohol.

Neither of the above processes is economically feasible, first because of the use of organic solvents which are expensive and more difficult to handle than water solutions, and second, because of the dilution employed to effect the separation which requires excessively large equipment for any large scale production.

At the present time the 4-nitroanthranilic acid is the one most sought for use in the preparation of other chemicals, and it is desirable that this isomer be isolated first so as to keep the process as simple as possible, particularly where the 5-nitroanthranilic acid is not to be obtained in particularly high purity, or in cases where it can be discarded.

It is therefore an object of the present invention to provide a simple and relatively inexpensive method for the separation of 4-nitroanthranilic from the isomeric 5-nitroanthranilic acid, from which process the 5-nitroanthranilic acid may also be isolated if desired. It is a further object of the invention to provide a process whereby the 4-nitroanthranilic acid is recovered in desirable crystalline form of sufficient purity for ordinary uses so that further purification is unnecessary, and which does not involve the use of expensive or hazardous organic solvents or extraordinarily large equipment for the amount of material to be processed.

According to the present process, the 4- and 5-nitroanthranilic acid mixture normally obtained from the Hofmann reaction on 4-nitrophthalimide, which consists in most cases of substantially 100% nitroanthranilic acids, is added to a solution of sulfuric acid of from 65% to 80% concentration in which the 4- and 5-nitroanthranilic acids are dissolved at temperatures of from 60° to 100° C. After the nitroanthranilic acids are completely dissolved, the solution is cooled to from 10° to 35° C. and agitated at this temperature for several hours. The 4-nitroanthranilic acid separates out and the slurry is filtered off to yield a light tan crystalline solid filter cake. This filter cake is then washed directly on the filter, but may be removed, slurried in water and refiltered. After sucking the filter cake as dry as possible, it is dried by any means desired, preferably under vacuum. The material thus obtained usually melts at 263° C. with decomposition and has a purity of approximately 93% of 4-nitroanthranilic acid. The remaining 7% is 5-nitroanthranilic acid. For most uses this product is of sufficient purity to be employed wherever 4-nitroanthranilic acid is desired. It can, however, be further purified where a product of higher purity is desired.

Where it is desired to recover the 5-nitroanthranilic acid, the acid filtrate is further diluted with water while heating to about 50° C. The dilution with water causes the 5-nitroanthranilic acid to be partly precipitated and the heating step is to disperse the lumpy aggregates which form. On chilling to about 25° C., and agitating for about one hour, the 5-nitroanthranilic acid is filtered off and the filter cake is washed free of acid and dried. This product is substantially 73% 5-nitroanthranilic acid containing approximately 27% of the 4-nitro isomer.

The separation of the 4-nitroanthranilic acid is preferably carried out using from 4 to 6 mols of sulfuric acid for each mol of the isomer mixture. When less than 4 mols are used the resulting slurry after cooling and crystallization is so thick and viscous that difficulty is encountered in attempting to filter the mass. When more than 6 mols of acid per mol of isomer mixture are employed, the yields of the 4-nitroanthranilic acid decrease and unnecessarily large volumes of solution must be worked. It is preferred to carry out the separation in about 5 mols of acid per isomer mixture.

The acid should be of a concentration of 65% to 80%, for when concentrations below 65% are used the purity of the product is decreased. At concentrations materially above 80% poor separation, if any, results. Usually a concentration of about 75% sulfuric acid is preferred, although the purity of the 4-nitroanthranilic acid obtained is increased when the higher concentrations within the limits given are employed. This increase in purity, however, is counterbalanced by a decrease in yield.

The solution is preferably heated to from 60° to 110° C. to effect complete solution of the isomeric mixture. The preferred temperature is around 80° C. If temperatures above 110° are employed, there is a tendency to effect sulfonation of some of the nitroanthranilic acid or cause decomposition. Where temperatures below 60° C. are used, the time required to effect complete solution makes the process uneconomical from a commercial standpoint. After complete solution of the isomeric mixture in the sulfuric acid has been completed, the solution is cooled and filtered at temperatures of from 10° to 35° C. At temperatures above 35° C. an excessive amount of 4-nitroanthranilic acid remains in solution, while temperatures materially below 10° C. increase the amount of 5-nitroanthranilic acid which is precipitated out with the 4-nitroanthranilic acid. The preferred operating temperature for the precipitation and filtration is ordinary room temperature.

The following examples are given to illustrate the invention. The parts used are by weight.

*Example 1*

A solution of 73% sulfuric acid is prepared from 28.25 parts of concentrated sulfuric acid (96%) and 9 parts of ice. To this solution, 9.5 parts of a Hofmann reaction product containing a mixture of 4- and 5-nitroanthranilic acids (composed of 65% 4-nitroanthranilic acid and 35% 5-nitroanthranilic acid) is added. The mass is heated with agitation to about 80° C., at which temperature complete solution of the solid organic mass has occurred. The solution is then chilled to 25° and held at this temperature for several hours, while stirring. The slurry thus obtained is filtered on a nutsch equipped with a glass filter cloth, and the acidic filtrate held for further processing.

The light tan crystalline solid on the nutsch is washed by allowing 35 parts of water to soak into the crystalline magnum for 15 minutes and then applying vacuum to remove the liquid. This soaking and draining process is repeated until the pH of the wash liquor rises to about 3.5. The cake is then sucked as dry as possible on the nutsch and the orange-red 4-nitroanthranilic acid dried in a vacuum oven overnight. The dried material consists of 4.14 parts and has a melting point of 263° C. (with decomposition). This represents a recovery of 43% of the isomeric mixture and an isomer purity of 93% 4-nitroanthranilic acid. The sulfuric acid filtrate previously obtained is diluted with 320 parts of water and heated to 50° C. in order to aid the dispersion of the lumps. The resulting slurry is chilled to 25° C. and held at this temperature for 1 hour while agitation is continued. The solid material is then removed by filtration through a filter press equipped with cotton filter cloths and the cake washed free of acid and dried. The dried material, consisting of 5 parts, represents 52.5% by weight of the starting material. The isomer content of the yellow solid is 73% 5-nitroanthranilic acid and 27% 4-nitroanthranilic acid.

Using the procedure described in Example 1, a number of other separations were carried out. The altered conditions employed and the results obtained are described in Examples 2 to 6, inclusive.

*Example 2*

Where 4.6 mols of sulfuric acid were employed using a concentration of 73%, and the separation effected at 25° C., a 44.5% yield of 4-nitroanthranilic acid was obtained, based on the weight of the original mixture. This product had a purity of 92% 4-nitroanthranilic acid.

*Example 3*

Where 10.2 mols of sulfuric acid were employed, using a concentration of 67% and the separation effected at 25° C., a 35% yield of 4-nitroanthranilic acid was obtained, based on the weight of the original mixture. This product had a purity of 89% 4-nitroanthranilic acid. Upon precipitation of the 5-nitroanthranilic acid from the filtrate, a yield of 61% 5-nitroanthranilic acid, based on the weight of the original mixture, was obtained having a purity of 65%.

*Example 4*

Where 5.0 mols of sulfuric acid were employed, using a concentration of 80% and the separation effected at 25° C., a 38% yield of 4-nitroanthranilic acid was obtained, based on the weight of the original mixture. This product had a purity of 90% 4-nitroanthranilic acid.

*Example 5*

Where 4.75 mols of sulfuric acid were employed, using a concentration of 73% and the separation effected at 0° C., a 47% yield of 4-nitroanthranilic acid was obtained, based on the weight of the original mixture. This product had a purity of 86% 4-nitroanthranilic acid.

*Example 6*

Where 5.0 mols of sulfuric acid were employed using a concentration of 73% and the separation effected at 25° C., a yield of 39% of 4-nitroanthranilic acid was obtained, based on the weight of the original mixture. This product had a purity of 93% 4-nitroanthranilic acid, and upon precipitation of the 5-nitroanthranilic acid from the filtrate a yield of 60% 5-nitroanthranilic acid, based on the weight of the original mixture, was obtained having a purity of 72%.

I claim:

1. A process for separating 4-nitroanthranilic acid from a mixture containing 4- and 5-nitroanthranilic acid which comprises dissolving one mole of the isomeric mixture in from 4 to 6 mols of sulfuric acid of from 65% to 85% concentration at temperatures of from 60° to 110° C., cooling the solution to from 10° to 35° C. under agitation, and filtering off the 4-nitroanthranilic acid.

2. A process for separating 4-nitroanthranilic acid from a mixture containing 4- and 5-nitroanthranilic acid which comprises dissolving one mole of the isomeric mixture in from 4 to 6 mols of sulfuric acid of from 65% to 85% concentration at temperatures of from 60° to 110° C., cooling the solution to from 10° to 35° C., under agitation, filtering off the 4-nitroanthranilic acid and further diluting the filtrate to precipitate the 5-nitroanthranilic acid.

3. The process of claim 1 wherein the 4-nitroanthranilic acid filter cake is washed substantially free of sulfuric acid with water, and dried.

4. The process of claim 2 wherein the 5-nitroanthranilic acid is filtered off, washed substantially free of sulfuric acid with water, and dried.

5. A process for separating 4-nitroanthranilic acid from a mixture containing 4- and 5-nitroanthranilic acid which comprises dissolving 1 mol of the isomeric mixture in about 5 mols of sulfuric acid of about 75% concentration at a temperature of about 80° C., cooling the solution to from 10° to 35° C. under agitation, and filtering off the 4-nitroanthranilic acid.

6. A process for separating 4-nitroanthranilic acid from a mixture containing 4- and 5-nitroanthranilic acid which comprises dissolving 1 mol of the isomeric mixture in about 5 mols of sulfuric acid of about 75% concentration at a temperature of about 80° C., cooling the solution to from 10° to 35° C. under agitation, filtering off the 4-nitroanthranilic acid, and further diluting the filtrate to precipitate the 5-nitroanthranilic acid.

No references cited